(12) United States Patent
Harima

(10) Patent No.: US 8,320,776 B2
(45) Date of Patent: Nov. 27, 2012

(54) INFRARED TRANSMITTER

(75) Inventor: Tatsuji Harima, Machida (JP)

(73) Assignee: Kabushiki Kaisha Audio-Technica, Tokyo (JP)

( * ) Notice: Subject to any disclaimer, the term of this patent is extended or adjusted under 35 U.S.C. 154(b) by 417 days.

(21) Appl. No.: 12/689,935

(22) Filed: Jan. 19, 2010

(65) Prior Publication Data

US 2010/0183317 A1    Jul. 22, 2010

(30) Foreign Application Priority Data

Jan. 20, 2009   (JP) ................. 2009-010061

(51) Int. Cl.
*H04B 10/12*    (2006.01)
(52) U.S. Cl. .......... 398/201; 398/183; 398/196
(58) Field of Classification Search ........... 398/182–201
See application file for complete search history.

(56) References Cited

U.S. PATENT DOCUMENTS

| | | | | |
|---|---|---|---|---|
| 5,161,021 | A * | 11/1992 | Tsai | 725/81 |
| 6,480,699 | B1 * | 11/2002 | Lovoi | 455/41.2 |
| 7,193,544 | B1 * | 3/2007 | Fitelson et al. | 341/143 |
| 2001/0021230 | A1 * | 9/2001 | Myers et al. | 375/295 |
| 2004/0106380 | A1 * | 6/2004 | Vassiliou et al. | 455/73 |

FOREIGN PATENT DOCUMENTS

JP        11-41120 A      2/1999

* cited by examiner

*Primary Examiner* — Dzung Tran
(74) *Attorney, Agent, or Firm* — Sughrue Mion, PLLC

(57) ABSTRACT

An infrared transmitter transmits a signal via an infrared ray. The infrared transmitter includes: a signal converter for converting the signal into an infrared signal; an oscillator for oscillating a carrier frequency of the infrared signal; a controller for adjusting a cutoff frequency of a filter according to the carrier frequency; and the filter provided between the oscillator and the signal converter to reduce a spurious signal of a carrier wave. The cutoff frequency of the filter is adjusted by the controller.

4 Claims, 2 Drawing Sheets

INFRARED TRANSMITTER

BACKGROUND OF THE INVENTION

1. Field of the Invention

The present invention relates to an infrared transmitter. More specifically, the present invention relates to an infrared transmitter that can be stably used even with the increased number of channels used together by preventing generation of spurious noise and interference.

2. Description of the Related Art

Because infrared rays do not pass through walls, wireless communication utilizing the infrared rays provides excellent confidentiality. Infrared wireless microphones utilize the characteristic of the infrared rays to be free of signal interception from outside and to allow the same transmission channel to be used in two adjacent rooms without interfering. Thus, the infrared wireless microphones are used for many purposes.

An infrared transmitter, represented by the infrared wireless microphone, includes: an oscillator that supplies a carrier wave; a filter circuit that reduces a spurious signal of a transmission signal; an amplifier that amplifies an output from the filter circuit; and alight emitting diode (LED) that outputs an infrared signal.

The infrared transmitter employs an optical modulation system with which luminance of the LED is controlled according to the transmission signal. A single transmission channel uses a single carrier wave. Therefore, in an infrared transmitter with which a plurality of transmission channels can be used, the oscillator provides individual carrier waves as much as the number of the transmission channels.

A harmonic signal is a frequency component that is integer multiple of a fundamental frequency (here, carrier frequency). A radio signal emitted without eliminating the harmonic signal may cause interference between channels. Therefore, wireless transmission devices, including the infrared transmitter, have a filter circuit to eliminate the harmonic signal (spurious signal).

With a filter circuit with narrow passband, a plurality of carrier frequencies cannot be used. Thus, a multiple number of channels are difficult to be offered to the user. With a filter circuit with wide passband, the spurious signal cannot be eliminated. Thus, interference between adjacent channels is caused to degrade wireless communication.

Upon using together transmitters with which a plurality of channels can be used, the problem becomes more prominent. A relationship between the carrier frequency and the filter is described with reference to FIG. 2. In FIG. 2, the horizontal axis represents frequency; and the vertical axis represents output. FIG. 2 also depicts carrier frequencies f1 and f2 of an infrared transmitter. The use of the carrier frequency f1 is accompanied by generation of the spurious signal and an unintended frequency component is transmitted because the spurious signal has a certain signal level. Generally, the use of a carrier frequency f1 is accompanied by a plurality of spurious signals. For the convenience of explanation, FIG. 2 only depicts a second harmonic signal (f1×2).

A filter 1 is used to eliminate the harmonic signal (f1×2), which is a frequency component outside a necessary bandwidth of a signal to be transmitted from the infrared transmitter. Here, the filter 1 is a low-pass filter. Instead, the filter 1 may be a band pass filter. A characteristic of the filter 1 is depicted with a dotted line in FIG. 2. The spurious signal (f1×2) of the carrier frequency f1 can be eliminated with the filter 1. However, an infrared transmitter with which a plurality of signal channels can be used uses a plurality of carrier frequencies. For example, as shown in FIG. 2, the carrier frequency f2 is used together with the carrier frequency f1. The carrier frequency f2 is also accompanied by a harmonic signal (f2×2), which has a frequency higher than a cutoff frequency of the filter 1. Therefore, another filter that eliminates the harmonic signal (f2×2) is required.

To eliminate the harmonic signal (f2×2), a filter 2 is used that has a cutoff frequency higher than that of the filter 1. A characteristic of the filter 2 is described with a two-dot chain line in FIG. 2. If the cutoff frequency of the filter 2 is higher than that of the spurious signal (f1×2) of the carrier frequency f1, the spurious signal (f1×2) of the carrier frequency f1 cannot be eliminated therewith.

As a technique to solve the above problem, a transmitter is known with which a plurality of output signals can be used while reducing a spurious signal by switching between a plurality of filter circuits according to a frequency of an output signal (see, for example, Japanese Patent Application Publication No. 11-41120).

The technique disclosed in Japanese Patent Application Publication No. 11-41120 that reduces a spurious signal by appropriately switching between a plurality of filter circuits has following problems: when the number of transmission channels increases and bands between the channels become narrow, a plurality of filters are required having narrow band pass frequency corresponding thereto, thereby leading to an inconvenient larger sized circuit; and the use of a number of filter circuits by appropriately switching therebetween makes a stable operation difficult.

SUMMARY OF THE INVENTION

In view of the above, an object of the present invention is to provide an infrared transmitter allowing a use of a plurality of channels with which a number of channels can be used by making a cutoff frequency of a filter circuit adjustable according to a carrier frequency.

An infrared transmitter according to an aspect of the present invention transmits a signal via infrared ray. The infrared transmitter includes; a signal converter for converting the signal into an infrared signal; an oscillator for oscillating a carrier frequency of the infrared signal; a controller for adjusting a cutoff frequency of a filter according to the carrier frequency; and the filter provided between the oscillator and the signal converter to reduce a spurious signal of a carrier wave. The cutoff frequency of the filter is adjusted by the controller.

In the infrared transmitter according to the aspect of the present invention, the filter may include a variable capacitance diode so that the cutoff frequency is adjusted in a non-step manner as the controller adjusts a voltage applied to the variable capacitance diode.

In the infrared transmitter according to the aspect of the present invention, the filter may be a low-pass filter.

In the infrared transmitter according to the aspect of the present invention, the filter may be a band pass filter.

With the present invention, in an infrared transmitter with which a plurality of transmission channels can be used, a spurious signal can be effectively reduced with a single filter circuit because a characteristic of the filter circuit that reduces the spurious signal can be adjusted according to a frequency of a transmission signal. Moreover, the present invention provides an infrared transmitter with which a number of channels can be used that can be downsized and can be stably operated with a single filter circuit.

DETAILED DESCRIPTION OF THE PREFERRED EMBODIMENTS

Figure 1:
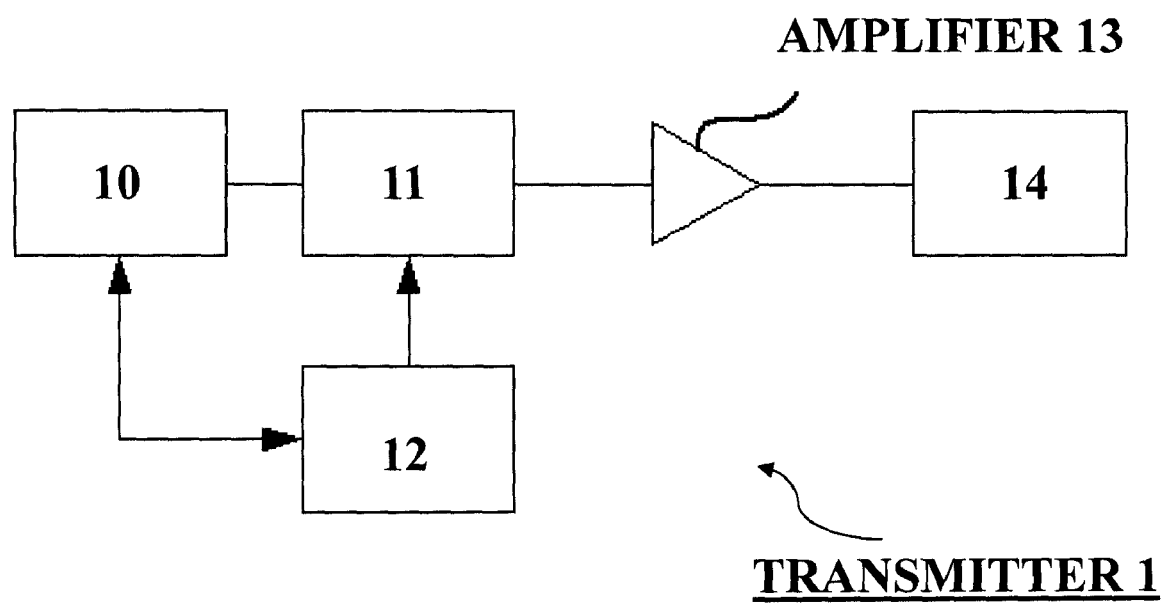
FIG. 1 is a functional block diagram of an infrared transmitter according to an embodiment of the present invention.
Figure 2:
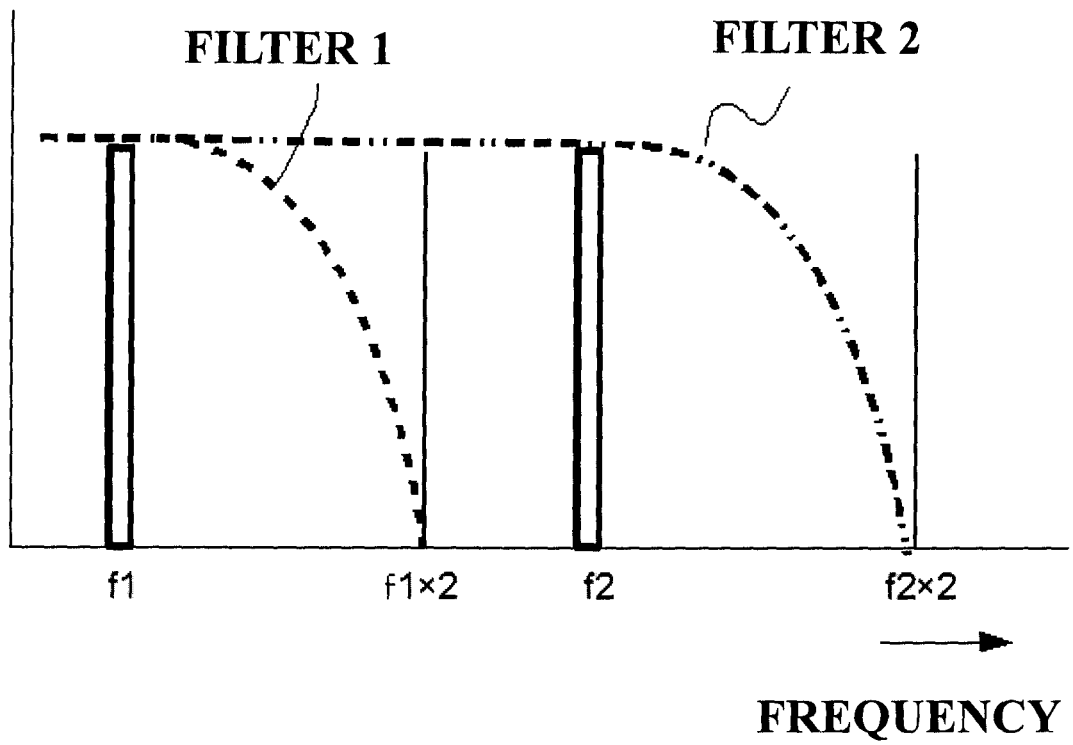
FIG. 2 is a graph depicting a conventional relationship between a transmission frequency and a filter characteristic.

An infrared transmitter according to an embodiment of the present invention will be described with reference to the accompanying drawings. FIG. 1 is a block diagram depicting a configuration example of the infrared transmitter according to the embodiment of the present invention. In FIG. 1, this transmitter 1 includes: a voltage-controlled oscillator (VCO) 10 that oscillates a carrier wave; a filter 11 that reduces a spurious signal; a controller 12 that adjusts a cutoff frequency of the filter 11 according to an oscillation frequency of the VCO 10; an amplifier 13 composed of an amplifying circuit that amplifies an output from the filter 11; and an signal converter 14 that transmits an infrared signal according to an output from the amplifier 13.

The VCO 10 includes: an oscillating circuit that oscillates a carrier wave of a frequency corresponding to a channel under use set with a setting unit (not shown); and a modulating circuit that modulates, with the carrier wave, a transmission signal received from a signal source (not shown). The frequency of the carrier wave oscillated by the VCO 10 is a frequency of the channel under use.

The filter 11 is composed of a filter circuit that reduces a spurious signal of the signal output from the VCO 10. The cutoff frequency of the filter circuit 11 is adjusted by the controller 12. Thus, the filter 11 is a filter circuit of which a characteristic can be adjusted according to, for example, a control signal from the controller 12.

The controller 12 is composed of a controlling circuit that adjusts the characteristic of the filter 11 to be most suitable for the oscillation frequency set for the VCO 10. The controller 12 is a circuit having a microcomputer that adjusts the cutoff frequency to make the characteristic of the filter 11 most suitable for the oscillation frequency set for the VCO 10.

The amplifier 13 is composed of the amplifying circuit that amplifies the signal output from the filter 11 and outputs the amplified signal to the signal converter 14.

The signal converter 14 is a circuit composed of an infrared light-emitting diode (IRLED) that converts the transmission signal amplified by the amplifier 13 into an infrared signal.

The filter 11 may be a low-pass filter that passes only frequency components equal to or lower than the cutoff frequency and eliminates frequency components higher than the cutoff frequency. The filter 11 may also be a band pass filter that passes only frequency components included in a certain frequency band defined by two cutoff frequencies, and eliminates frequency components not included therein.

The filter 11 may have a variable capacitance diode so that the cutoff frequency of the filter 11 can be adjusted in a non-step manner as the controller 12 adjusts the voltage applied to the variable capacitance diode.

In the transmitter 1, the VCO 10 oscillates the carrier wave corresponding to a transmission channel selected by a user. The characteristic of the filter 11 can be adjusted to have the cutoff frequency most suitable for the carrier frequency set for the VCO 10. Thus, a spurious signal of the transmission signal obtained by modulating the signal received from the signal source not shown (e.g., a sound signal via an electro-acoustic transducing element) with the carrier wave, can be effectively eliminated.

Therefore, the filter characteristic can be automatically set to be most suitable for reducing a spurious signal according to the transmission channel arbitrary selected by the user. As a result, spurious noise and interference can be effectively prevented upon use of the transmitter with which a number of channels can be used.

The infrared transmitter of the present invention described above in the embodiment of the present invention can be advantageously applied, for example, to the infrared wireless microphone with which a plurality of channels can be used.

What is claimed is:

1. An infrared transmitter for transmitting a signal via an infrared ray, the infrared transmitter comprising:
   a signal converter for converting the signal into an infrared signal;
   an oscillator for oscillating a carrier frequency of the infrared signal;
   a controller for adjusting a cutoff frequency of a filter according to the carrier frequency; and the filter provided between the oscillator and the signal converter, the filter having the cutoff frequency adjusted by the controller,
   wherein the filter includes a variable capacitance diode so that the cutoff frequency is adjusted in a non-step manner as the controller adjusts a voltage applied to the variable capacitance diode, and
   the signal converter comprises an infrared light-emitting diode (IRLED).

2. The infrared transmitter according to claim 1, wherein the filter is a low-pass filter.

3. The infrared transmitter according to claim 1, wherein the filter is a band pass filter.

4. The infrared transmitter according to claim 1, further comprising:
   an amplifier which is coupled to an output of the filter and to an input of the signal converter and amplifies the filtered signal,
   wherein the IRLED is configured to convert the signal amplified by the amplifier into the infrared signal.

* * * * *